(12) United States Patent
Evanovich et al.

(10) Patent No.: US 7,384,547 B2
(45) Date of Patent: Jun. 10, 2008

(54) REPLACEABLE FILTER ELEMENT WITH INTEGRAL ANNULAR TRAP

(75) Inventors: Steven R. Evanovich, Pittsburgh, PA (US); Russell Olmsted, Mount Lebanon, PA (US); Stevan Karanovich, Monaca, PA (US); Steve Smith, Ridgley, PA (US); Christopher Bortnik, Warrendale, PA (US)

(73) Assignee: Schroeder Industries, LLC, Leetsdale, PA (US)

( * ) Notice: Subject to any disclaimer, the term of this patent is extended or adjusted under 35 U.S.C. 154(b) by 36 days.

(21) Appl. No.: 11/622,790

(22) Filed: Jan. 12, 2007

(65) Prior Publication Data
US 2008/0023389 A1    Jan. 31, 2008

Related U.S. Application Data

(63) Continuation of application No. PCT/US2005/24684, filed on Jul. 12, 2005.

(60) Provisional application No. 60/587,124, filed on Jul. 12, 2004.

(51) Int. Cl.
*B01D 29/76* (2006.01)
*B01D 29/15* (2006.01)
*B01D 29/17* (2006.01)
*B01D 29/33* (2006.01)

(52) U.S. Cl. .................. 210/232; 210/131; 210/299; 210/309; 210/450

(58) Field of Classification Search ............... 210/131, 210/232, 299, 309, 450
See application file for complete search history.

(56) References Cited

U.S. PATENT DOCUMENTS

| 528,652 | A | 11/1894 | Bowden |
| 2,210,213 | A | 8/1940 | Long |
| 2,471,069 | A | 5/1949 | Le Clair |
| 2,736,435 | A | 2/1956 | Gardes et al. |
| 3,012,676 | A | 12/1961 | Englesberg |
| 3,054,507 | A | 8/1962 | Humbert, Jr. et al. |
| 3,224,583 | A | 12/1965 | Rosaen |
| 3,288,290 | A | 11/1966 | Rosaen |
| 3,288,291 | A | 11/1966 | Rosean |
| 3,353,680 | A | 11/1967 | Niebergall |

(Continued)

FOREIGN PATENT DOCUMENTS

EP    0375373    6/1990

*Primary Examiner*—Thomas M Lithgow
(74) *Attorney, Agent, or Firm*—Blynn L. Shideler; Krisanne Shideler; BLK Law Group

(57) ABSTRACT

The replaceable, outside-in flow filter element with integral annular trap provides a simple, efficient, tubular filter element that combines the advantages of inside out-flow and outside-in flow filters. The element includes end caps with pleated filter media extending there between. A solid tube is secured between the end caps in a position spaced radially outward from the media. The annular space between the media and the tube forms an integral, lateral, outer trap for containing filtered out particulate matter. The trap allows the particulate to be removed with the used filter element during conventional replacement. The inlet end cap includes openings spaced from an end of the filter media whereby a portion of the openings overlap the media in plan view such that inflow through this overlapping portion of the openings will flow radial outward in the space between the openings and the filter media to the annular space.

19 Claims, 3 Drawing Sheets

U.S. PATENT DOCUMENTS

| | | |
|---|---|---|
| 3,370,708 A | 2/1968 | Hultgren et al. |
| 3,396,103 A | 8/1968 | Huntington |
| 3,397,786 A | 8/1968 | Hultgren |
| 3,561,604 A | 2/1971 | Yotsumoto |
| 3,591,010 A | 7/1971 | Pall |
| 3,708,965 A | 1/1973 | Domnick |
| 4,081,379 A | 3/1978 | Smith |
| 4,108,775 A | 8/1978 | Wilkes et al. |
| 4,124,360 A | 11/1978 | Berger, Jr. et al. |
| 4,133,763 A | 1/1979 | Cooper |
| 4,251,374 A | 2/1981 | Cunningham |
| 4,271,025 A | 6/1981 | Erdmannsdorfer |
| 4,334,994 A | 6/1982 | Jensen |
| 4,350,509 A | 9/1982 | Alseth et al. |
| 4,353,366 A | 10/1982 | Bickford |
| 4,504,387 A | 3/1985 | LeMire et al. |
| 4,545,905 A | 10/1985 | Poe |
| 4,557,834 A | 12/1985 | Mason |
| 4,601,821 A | 7/1986 | Sherman et al. |
| 4,617,117 A | 10/1986 | Messinger et al. |
| 4,632,682 A | 12/1986 | Erdmannsdorfer |
| 4,693,820 A | 9/1987 | Baxter |
| 4,798,670 A | 1/1989 | Treene |
| 4,816,162 A | 3/1989 | Rosskopf et al. |
| 4,806,242 A | 5/1989 | Rosskopf et al. |
| 4,892,667 A | 1/1990 | Parker, III et al. |
| 4,909,937 A | 3/1990 | Hoffmann et al. |
| 4,963,258 A | 10/1990 | Yagishita |
| 5,013,434 A | 5/1991 | Furrow |
| 5,085,769 A | 2/1992 | Klausen et al. |
| 5,104,532 A | 4/1992 | Thompson et al. |
| 5,152,890 A | 10/1992 | Linnersten |
| 5,180,489 A | 1/1993 | Bourgeois |
| 5,190,651 A | 3/1993 | Spencer et al. |
| 5,196,119 A | 3/1993 | Harms et al. |
| 5,211,846 A | 5/1993 | Kott et al. |
| 5,342,511 A | 8/1994 | Brown et al. |
| 5,401,401 A | 3/1995 | Hickok et al. |
| 5,405,579 A | 4/1995 | Melzer et al. |
| 5,520,801 A | 5/1996 | Gerber et al. |
| 5,587,066 A | 12/1996 | Covington |
| 5,593,578 A | 1/1997 | Bryan et al. |
| 5,660,729 A | 8/1997 | Baumann |
| 5,670,042 A | 9/1997 | Clausen et al. |
| 5,685,985 A | 11/1997 | Brown et al. |
| 5,695,636 A | 12/1997 | Gullett |
| 5,702,602 A | 12/1997 | Brown et al. |
| 5,711,872 A | 1/1998 | Jones et al. |
| 5,718,825 A | 2/1998 | Greive et al. |
| 5,772,881 A | 6/1998 | Stockhowe et al. |
| 5,800,584 A | 9/1998 | Hinderer et al. |
| 5,811,002 A | 9/1998 | Felber |
| 5,846,416 A | 12/1998 | Gullett |
| 5,846,417 A | 12/1998 | Jiang et al. |
| 5,868,932 A | 2/1999 | Guichaoua et al. |
| 5,876,600 A | 3/1999 | Matsubara et al. |
| 5,906,736 A | 5/1999 | Bounnakhom et al. |
| 5,919,362 A | 7/1999 | Barnes et al. |
| 5,980,761 A | 11/1999 | Boissie et al. |
| 5,984,109 A | 11/1999 | Kanwar et al. |
| 6,203,697 B1 | 3/2001 | Ferguson |
| 6,217,755 B1 * | 4/2001 | Stifelman et al. ........... 210/116 |
| 6,217,763 B1 | 4/2001 | Lawrence et al. |
| 6,322,697 B1 | 11/2001 | Hacker et al. |
| 6,419,839 B1 | 7/2002 | Cox et al. |
| 6,517,717 B1 | 2/2003 | Håkansson |
| 6,835,310 B2 | 12/2004 | Lescoche |
| 6,843,377 B1 | 1/2005 | Roll |
| 6,893,573 B2 | 5/2005 | Dover et al. |
| 6,896,798 B2 | 5/2005 | Dover et al. |
| 6,919,023 B2 | 7/2005 | Merritt et al. |
| 6,984,319 B2 | 1/2006 | Merritt et al. |
| 6,991,112 B2 | 1/2006 | Ham |
| 7,014,761 B2 | 3/2006 | Merritt et al. |
| 7,094,343 B2 | 8/2006 | Moessinger et al. |
| 7,160,446 B2 | 1/2007 | Bergstrom |
| 7,166,215 B2 | 1/2007 | Reid |
| 7,168,387 B1 | 1/2007 | Al-Garni et al. |
| 7,168,573 B2 | 1/2007 | Brown et al. |
| 7,179,380 B2 | 2/2007 | Merritt et al. |
| 7,182,864 B2 | 2/2007 | Brown et al. |

* cited by examiner

REPLACEABLE FILTER ELEMENT WITH INTEGRAL ANNULAR TRAP

RELATED APPLICATION

The present application is a continuation of International Patent Application PCT/US2005/024684 filed Jul. 12, 2005 and entitled "Replaceable Filter Element with Integral Annular Trap" and which claimed the benefit of U.S. provisional application Ser. No. 60/587,124 entitled "Replaceable Filter Element with Integral Annular Trap" filed Jul. 12, 2004. International Patent Application PCT/US2005/024684 filed Jul. 12, 2005 published Feb. 16, 2006 as publication number WO 2006/017284 A2 which is incorporated herein by reference.

BACKGROUND OF THE INVENTION

1. Field of the Invention

The present invention relates to replaceable filter elements. Specifically, the present invention relates to an outside-in flow replaceable filter element with integral annular trap.

2. Background Information

Hydraulic systems are frequently used in heavy machinery, including cranes, backhoes, demolition shears, bulldozers, and the like. In such hydraulic systems, it is important to keep the hydraulic fluid free of debris. Consequently, filter units or filter assemblies have been incorporated in the hydraulic systems to filter debris from the hydraulic fluid. Fuel systems and lubrication systems have also incorporated filter assemblies to clean the working fluid (with the fuel system being the only systems that do not typically re-circulate the working fluid).

It is common to form the filter assembly with a replaceable filter element. One common configuration is a tubular filter media in which the fluid being cleaned flows in a radial direction through the tubular pleated media. The direction of flow in such a structure defines the filter element as an outside-in (flow of fluid being cleaned is inward radial direction) or an inside-out (flow of fluid being cleaned is outward radial direction) filter structure. Examples of the tubular structure type filter elements include the K series element sold by Schroeder Industries, LLC, with the direction of flow for this element being defined by the associated assembly. From an operational standpoint there are certain advantages to outside-in flow and other advantages with inside-out flow. Namely with outside-in flow the pleat structure is more stable at higher pressure when constructed with a traditional fan pleat. This structure also exhibits higher dirt holding capacity as compared to similar inside out designs, since the media pleats are uniformly exposed to the system flow which results in a more uniform distributed deposition pattern. Alternatively with inside-out flow there is an advantage in that larger particles on the up-stream side of the filter remain in the center and are easily removed with the filter element, whereas in the outside in configurations such particles can, in theory, contaminate the system by falling or migrating past the filter location during filter element replacement. This contamination may occur after system flow stops which may allow particles on the outer most media layer to become dislodged and further contaminate the upstream fluid or settle within the filter housing. If this condition occurs and the element is removed from the filter housing (i.e. replacement of the filter element); the dislodged particles in the upstream fluid may contaminate the fluid downstream of the filter assembly.

U.S. Pat. No. 6,322,697 (the '697 patent) explains that contamination "is an important consideration relating to filter assemblies having replaceable filter elements. For example, prior art systems having replaceable filter elements can experience the accumulation of contaminants within the reusable housings that cover the replaceable filter elements. If this occurs, the "clean" side of new filter elements inserted within the contaminated housings can immediately become contaminated. There is a need in the art to prevent this type of contamination from occurring." The '697 patent discloses six separate embodiments of the invention to address this problem using a cap surrounding an annular "trap" area. However, in the cap designs in the '697 patent the openings in the top cap are aligned with the annular area and necessarily will have a reduced area than that of the trap forming area (due to the outwardly extending portions of the cap), and this can form a restriction for flow. There is a need in the industry for a simple, efficient, tubular filter element that combines the advantages of inside out-flow and outside-in flow, and which does not introduce flow limiting characteristics.

SUMMARY OF THE INVENTION

The problems set out above are solved by an outside-in, tubular filter element with integral annular trap according to the present invention. The replaceable, outside-in flow filter element with integral annular trap provides a simple, efficient, tubular filter element that combines the advantages of inside out-flow and outside-in flow filters. The element includes an outlet or lower end cap and an inlet or upper end cap with a tubular support tube and pleated filter media extending there between. A solid tube is secured to the outlet end cap and the inlet end cap in a position spaced from the outer radial position of the pleated media. The annular space between the media and the tube forms an integral, lateral, outer trap for containing filtered out particulate matter. The trap allows the particulate, if any, to be removed with the old used filter element during conventional replacement of the filter element. The inlet end cap or upper end cap includes opening for inflow, wherein at least a portion of the openings overlap the filter media in a plan view such that inflow through this overlapping portion of the openings will flow radial outward in the space between the openings and the filter media to the annular space. The openings, or slots, are provided in the end cap in the manner described to allow sufficient flow of fluid to be cleaned through the filter media.

These and other advantages of the present invention will be clarified in the description of the preferred embodiment taken together with the attached figures wherein like reference numerals represent like elements throughout.

DETAILED DESCRIPTION OF THE PREFERRED EMBODIMENT

Figure 1:
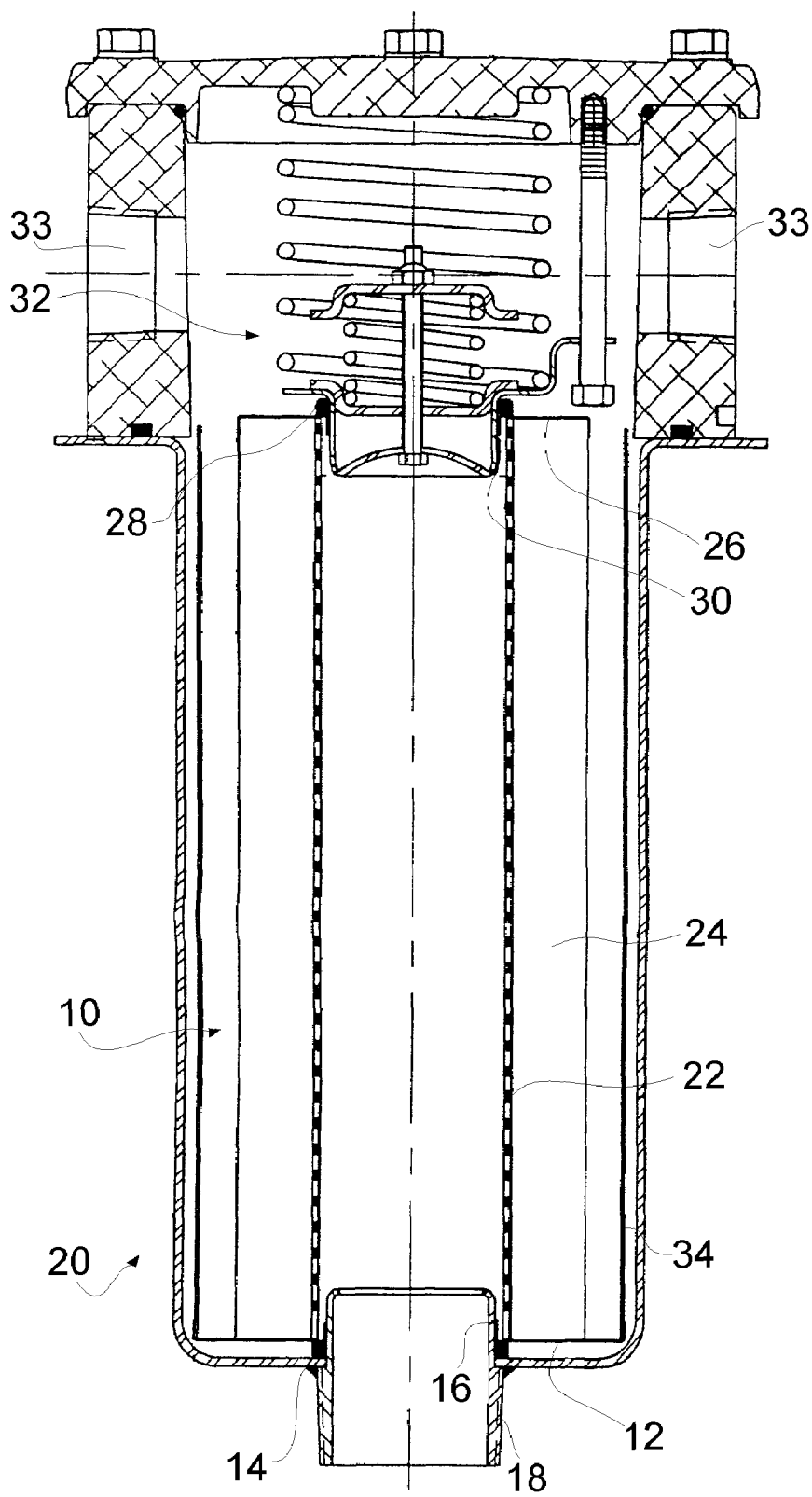
FIG. 1 is a sectional view of an outside-in flow, replaceable filter element with an integral annular trap according to a first embodiment of the present invention.

FIG. 1 is a schematic view of an outside-in flow, replaceable filter element 10 according to the present invention. The term "outside-in flow", or "outside-in" as well as "inside-out" within the meaning of this application refers to the radial direction of flow of the fluid being cleaned through the tubular media of the subject filter element. The filter element of the present invention is distinguished from a spin on a filter unit, as found in an automotive oil filter. These spin on filter units include the housing structure integral therewith sufficient to take the pressure load and form a closed filter housing. These spin on filter units can present disposal problems in many applications. The filter elements such as the present invention are made to be placed into existing filter housing or filter chamber. The outside-in structure means that the intended flow is from outside the tubular filter media to the inside of the tubular media. "Lower" and "Upper" are only used herein in reference to the relative position of the elements in the illustrated drawings, and not to define specific required orientations of these elements in operation (i.e. the subject filter could be turned "horizontally" in actual implantation from what is shown, or even inverted, without changing the aspects of the invention.

The filter element 10 includes a solid, annular outlet end cap 12 with a retaining member 14, such as a standard O-ring retainer, attached thereto. The retaining member 14 is sized to seal onto a seating surface 16 of an outlet 18 for the filter assembly 20. The seal between the retaining member 14 and the seating surface 16 of the outlet 18 prevents the fluid to be cleaned from bypassing the filer media of the filter element 10.

A center perforated support tube 22 is attached to and extends from the annular outlet end cap 12. A pleated, annular filter media 24 is bonded to end cap 12 surrounding and supported by the tube 22. The specific structure of the filter media 24 and the support tube 22 are generally known in the art and need no be described in detail herein.

An annular inlet end cap 26 with a retaining member 28 is attached to the filter media 24 and the support tube 22 at the opposed end of the filter element 10 from the outlet end cap 14. The retaining member 28 is sized to seal onto a seating surface 30 of a spring biased inlet end mount and bypass assembly 32. The spring biased inlet end mount is known in the art and includes a general bypass assembly. The seal between the retaining member 28 and the seating surface 30 of the assembly 32 prevents the fluid to be cleaned from bypassing the filer media 24 of the filter element 10, unless the bypass is activated. The bypass operates in a conventional manner as an emergency bypass. The bypass spring is set to a by-pass pressure. If the filter media 24 is close to reaching its capacity (i.e. it is clogged), the pressure in the upstream or inlet side will increase until it reaches the by-pass pressure of the spring. At the by-pass pressure the spring will be depressed allowing fluid to by-passes the filter media 24, as known in the art. Additionally the remaining elements of the header portion of the filter assembly 20 are known, including conventional inlet ports 33.

The filter element 10 according to the present invention further includes a solid tube 34 secured to the outlet end cap 14 in a position spaced from the outer radial position of the pleated media 24. The annular space between the media 24 and the tube 34 forms an integral, lateral, outer trap 36 for containing filtered out particulate matter. The tube 34 allows the particulate, if any, to be removed with the old used filter element 10 during conventional replacement of the filter element 10. The spacing between the media 24 and the tube 34 (i.e. the width of the trap 36) should be selected to avoid interference with the flow through the entire length of media 24. For example, for an outer radius of the media 24 of 4.3739 centimeters (1.722 inches), the tube will have an inner radius of about 5.2324 centimeters (2.06 inches), and prototypes of 5.2197 centimeters and 5.2578 centimeters (2.055 inches and 2.07 inches, respectively) have been designed.

The replaceable, outside-in flow filter element 10 with integral annular trap 36 provides a simple, efficient, tubular filter element that combines the advantages of inside outflow and outside-in flow filters. In other words it is an outside in flow element which is designed to keep the sludge or particulate matter with the element during replacement thereof. There is no change in the filter operation or maintenance, although the present invention may be allowed to drain after removal to minimize the oil or fluid lost (or which needs to be disposed).

Figure 2:
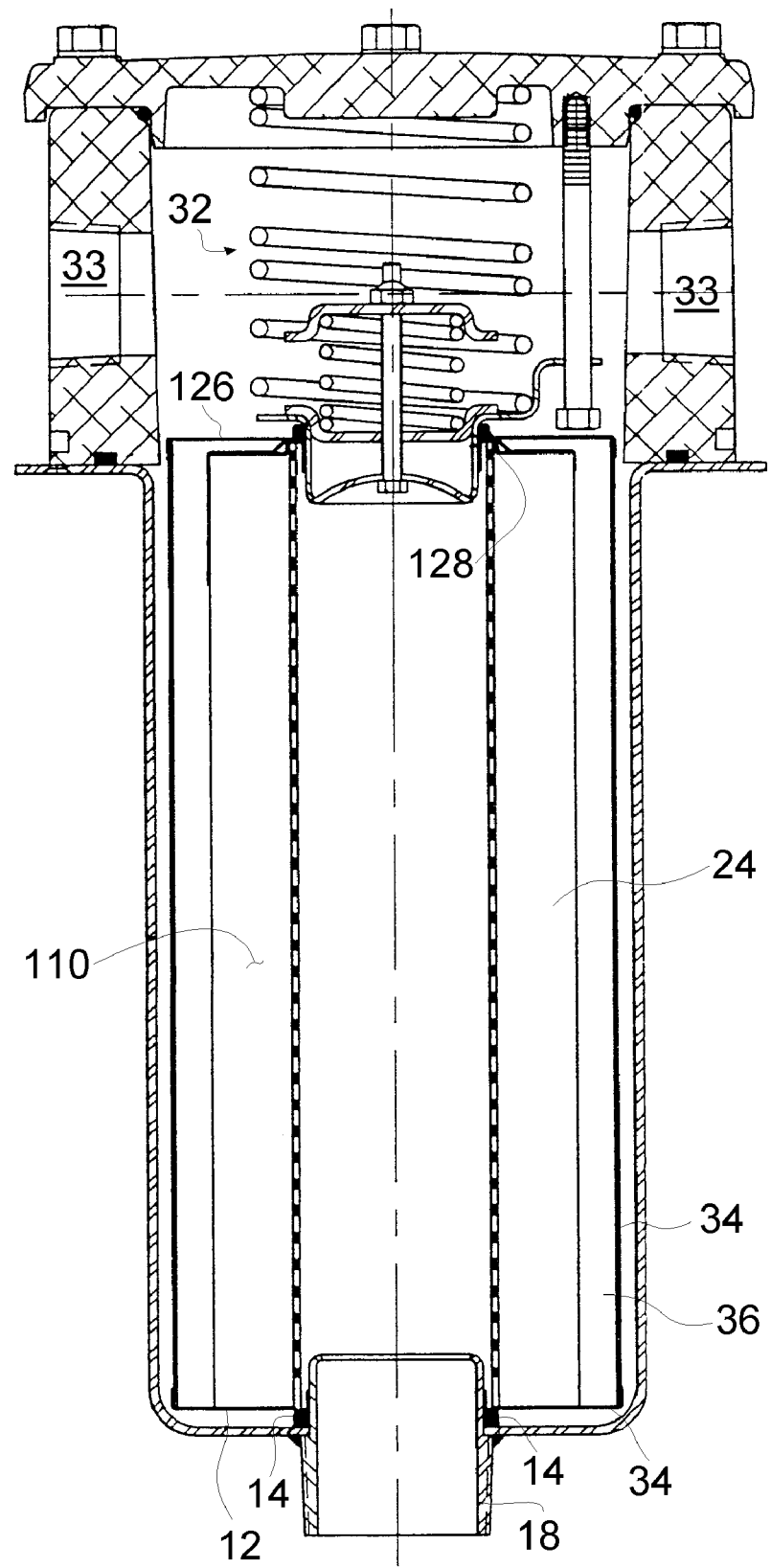
FIG. 2 is a sectional view of an outside-in flow, replaceable filter element with an integral annular trap according to a second embodiment of the present invention.
Figure 4:
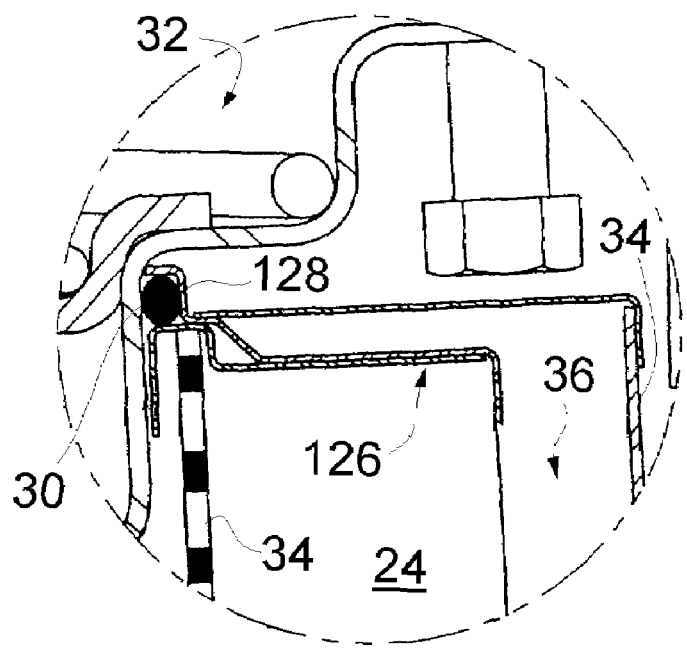
FIG. 4 is an enlarged sectional view of an inflow end cap structure for the filter element of FIG. 2.
Figure 3:
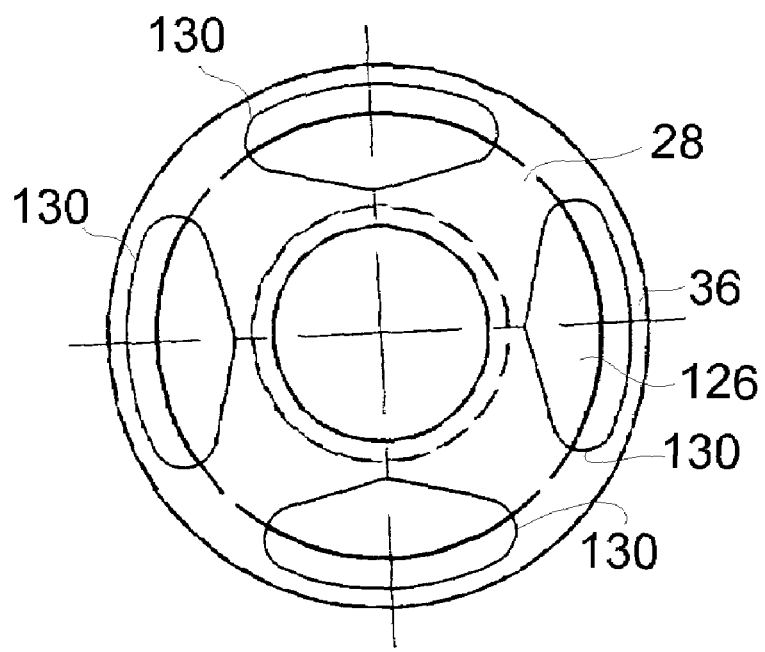
FIG. 3 is a plan view of the inflow end of the filter element of FIG. 2.

There are certainly various modifications to the filter element according to the present invention. FIGS. 2-4 illustrate an outside-in flow, replaceable filter element 110 with an integral annular trap 134 according to a second embodiment of the present invention. The filter element 110 is similar to the filter element 10 with the filter element 110 including a solid, annular outlet end cap 12 with a retaining member 14, a center perforated support tube 22, annular filter media 24, a solid tube 34, and an integral, lateral, outer trap 36 for containing filtered out particulate matter as discussed above in connection with filter element 10. The filter assembly 20 includes outlet 18 with seating surface 16, seating surface 30, assembly 32 and inlet ports 33 as discussed above in connection FIG. 1.

The filter element 110 differs from element 10 in that a three piece annular inlet end cap 126 with a retaining member 128 (as shown in FIG. 4) is attached to the filter media 24 and the support tube 22 at the opposed end of the filter element 10 from the outlet end cap 14. The retaining member 128 is sized to seal onto a seating surface 30 of a spring biased inlet end mount and bypass assembly 32 as discussed above in connection with FIG. 1. Further, the end cap 126 is secured to the tube 38 as shown in FIG. 4. The attachment of the end cap 126 to the tube 38 provides stability to the trap 36 and the entire element 110. Openings or slots 130 are provided in the end cap 126, as shown in FIG. 3, to allow sufficient flow of fluid to be cleaned through the filter media 24. For example with the radii of the tube 34 and media 24 discussed above, the slots can have an area of 29.03 square centimeters to 32.26 square centimeters (4.5 to 5 square inches) to provide adequate flow.

In the embodiment of FIGS. 2-4 of the present invention has the cap 126 attached to the trap forming tube 34, and the cap has a series of openings 130 therein to allow fluid to flow to the trap 36. One unique aspect of this design is that the openings 130 are spaced from the top end of the filter media 24 by a space that allows the fluid to flow outwardly to the annular trap area on the other side of the openings 130. With this constructions the openings 130 can be sized so that they do not inhibit flow (i.e. they do not create a bottleneck in the flow), whereby the openings 130 need not be the limiting factor in the flow capacity of the filter element. The openings 130 may be selected to conform to the flow characteristics of the remaining construction.

The other advantages of the present invention will be apparent to those in the art. The invention has been described with reference to the preferred embodiment. Obvious modifications and alterations will occur to others upon reading and understanding the proceeding detailed description. It is intended that the invention be construed as including all such modifications and alterations. The scope of the present invention is defined by the appended claims and equivalents thereto.

What is claimed is:

1. An outside-in flow replaceable filter element (110) comprising:

An axially extending annular filter media (24);

A lower end cap (12) and an upper end cap (126) attached to opposed lower and upper ends, respectively, of the annular filter media, the upper end cap (126) allowing inflow to the radial outer side of the annular filter media (24) through an upper end cap first portion having openings (130) therein, and the upper end cap having an axially spaced second portion attached directly to the filter media (24), and the lower end cap (12) allowing out flow from a radial inner side of the annular filter media;

At least retaining member (14, 128) for each end cap (12, 126) adapted to seal against a corresponding seating surface;

A solid tube (34) attached to the lower end cap (12) and extending to and attached directly to the first portion of the upper end cap (126), the solid tube (34) spaced from the radial outer side of the annular filter media (24) forming an annular space (36), characterized in that the annular space (36) between the solid tube (34) and the annular filter media (24) forms an integral lateral outer trap for containing filtered out particulate matter in the outside-in flow replaceable filter element (110), and wherein the openings (130) in the first portion of the upper end cap (126) are spaced from an end of the filter media (24) adjacent the upper end cap (126) whereby at least a portion of the openings (130) overlap the filter media (24) in a plan view such that inflow through this overlapping portion of the openings (130) will pass through the openings (130) in the first portion of the upper end cap and impact the axially spaced second portion of the upper end cap which causes a radially outward flow in the space between the openings (130) in the first portion of the upper end cap and the filter media (24) into the annular space (36).

2. The outside-in flow replaceable filter element (110) of claim 1 wherein the annular filter media (24) is a pleated media that is bonded to the end caps (126).

3. The outside-in flow replaceable filter element (110) of claim 1 further including a perforated center support tube (22) extending between the end caps (12, 126).

4. The outside-in flow replaceable filter element (110) of claim 1 wherein the lower end cap (12) is a solid annular end cap having the outlet therein.

5. The outside-in flow replaceable filter element (110) of claim 1 wherein each retaining member (14, 128) is an O-ring retainer.

6. The outside-in flow replaceable filter element (110) of claim 1 wherein the upper end cap (126) further includes an opening for a bypass assembly (32).

7. The outside-in flow replaceable filter element (110) of claim 1 wherein the width of the annular trap (36) is about 20% of the radius of the outer side of the annular filter media (24).

8. The outside-in flow replaceable filter element (110) of claim 1 wherein the radius of the outer side of the annular filter media (24) is 4.3739 centimeters and the inner radius of the solid tube (34) is between 5.2197 centimeters and 5.2578 centimeters.

9. The outside-in flow replaceable filter element (110) of claim 1 wherein the annular filter media (24) is attached to the upper end cap (126) at a position spaced from the openings (130) in the upper end cap (126).

10. The outside-in flow replaceable filter element (110) of claim 9 wherein the first portion of the upper end cap (126) includes at least four openings (130) allowing inflow to the radial outer side of the annular filter media (24).

11. The outside-in flow replaceable filter element (110) of claim 1 wherein the openings (130) have a combined area of about 29.03 square centimeters to 32.26 square centimeters.

12. An assembly using the outside-in flow replaceable filter element (110) of claim 1, wherein the assembly includes a housing receiving the outside-in flow replaceable filter element (110) and including a lower outlet (18) having a seating surface (16) for receipt of a retaining member (14).

13. The assembly of claim 12 using the outside-in flow replaceable filter element (110) further including an inlet end mount and bypass assembly (32) on an inlet end of the filter element (110).

14. The assembly of claim 12 wherein the annular filter media (24) is a pleated media that is bonded to the end caps (12, 126).

15. The assembly of claim 12 wherein the width of the annular trap (36) is about 20% of the radius of the outer side of the annular filter media (24).

16. The assembly of claim 12 wherein the openings (130) have a combined area of about 29.03 square centimeters to 32.26 square centimeters.

17. The assembly of claim 12 wherein the first portion of the upper end cap (126) includes at least four openings (130) allowing inflow to the radial outer side of the annular filter media (24).

18. The assembly of claim 1 wherein the upper end cap (26) further includes an opening for a bypass assembly (32).

19. The outside-in flow replaceable filter element (110) of claim 1 wherein the annular filter media (24) is a pleated media that is bonded to the end caps (12, 126), and further including a perforated center support tube (22) extending between the end caps (12, 126).

* * * * *